United States Patent
Choudhury et al.

(10) Patent No.: US 10,728,140 B2
(45) Date of Patent: Jul. 28, 2020

(54) DEADLOCK-FREE TRAFFIC REROUTING IN SOFTWARE-DEIFNED NETWORKING NETWORKS

(71) Applicant: AT&T Intellectual Property I, L.P., Atlanta, GA (US)

(72) Inventors: Gagan Choudhury, Jackson, NJ (US); Kang Xi, Morganville, NJ (US); Simon Tse, Holmdel, NJ (US); Narayan Padi, Cedar Knolls, NJ (US); Alvin Goddard, Kendall Park, NJ (US); Aswatnarayan Raghuram, Morganville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 211 days.

(21) Appl. No.: 15/845,280

(22) Filed: Dec. 18, 2017

(65) Prior Publication Data
US 2019/0190819 A1 Jun. 20, 2019

(51) Int. Cl.
*H04L 12/721* (2013.01)
*H04L 12/723* (2013.01)
(Continued)

(52) U.S. Cl.
CPC .......... *H04L 45/38* (2013.01); *H04L 41/0896* (2013.01); *H04L 41/145* (2013.01);
(Continued)

(58) Field of Classification Search
CPC ......... G06F 15/17312; G06F 15/17343; H04L 12/66; H04L 12/4633; H04L 41/06;
(Continued)

(56) References Cited

U.S. PATENT DOCUMENTS

| 6,011,780 A | 1/2000 | Vaman et al. |
| 6,687,228 B1 | 2/2004 | Fichou et al. |

(Continued)

FOREIGN PATENT DOCUMENTS

| WO | WO 95/10029 | 4/1995 |
| WO | WO 2016/050302 | 4/2016 |
| WO | WO 2016/177404 | 11/2016 |

OTHER PUBLICATIONS

Ni et al., "A survey of Wormhole Routing Techniques in Direct Networks," Computer 26.2, Feb. 1993, pp. 62-76, IEEE 1993.
(Continued)

*Primary Examiner* — Marsha D Banks Harold
*Assistant Examiner* — Dharmesh J Patel
(74) *Attorney, Agent, or Firm* — Hartman & Citrin LLC

(57) ABSTRACT

Concepts and technologies disclosed herein are directed to deadlock-free traffic rerouting in software-defined networking ("SDN") networks. According to one aspect of the concepts and technologies disclosed herein, a centralized SDN controller can determine that a packet flow along a path within at least a portion of a network is to be rerouted from the path to a new path. The centralized SDN controller can initiate a reroute of the packet flow to the new path. The centralized SDN controller can request a bandwidth for the new path. The bandwidth can be determined such that bandwidth oversubscription on the new path is avoided. In response to the packet flow settling on the new path, the centralized SDN controller can adjust a requested bandwidth of the packet flow to a desired value to complete the reroute of the packet flow from the path to the new path.

20 Claims, 6 Drawing Sheets

(51) Int. Cl.
*H04L 12/771* (2013.01)
*H04L 12/24* (2006.01)
*H04L 12/803* (2013.01)
*H04L 12/851* (2013.01)
*H04L 12/801* (2013.01)
*H04L 12/715* (2013.01)
*H04L 12/717* (2013.01)
*H04L 12/707* (2013.01)
*H04L 12/703* (2013.01)

(52) U.S. Cl.
CPC .............. *H04L 45/22* (2013.01); *H04L 45/28* (2013.01); *H04L 45/42* (2013.01); *H04L 45/50* (2013.01); *H04L 45/56* (2013.01); *H04L 45/64* (2013.01); *H04L 47/11* (2013.01); *H04L 47/122* (2013.01); *H04L 47/2441* (2013.01)

(58) Field of Classification Search
CPC .............. H04L 41/145; H04L 41/0654; H04L 41/0668; H04L 41/0896; H04L 45/00; H04L 45/12; H04L 45/22; H04L 45/28; H04L 45/38; H04L 45/50; H04L 45/56; H04L 45/64; H04L 47/10; H04L 47/11; H04L 47/15; H04L 47/122; H04L 47/728; H04L 47/746; H04L 47/825; H04L 47/2441; H04Q 3/0079
See application file for complete search history.

(56) References Cited

U.S. PATENT DOCUMENTS

| | | | |
|---|---|---|---|
| 6,690,678 B1 | 2/2004 | Basso et al. | |
| 7,593,321 B2 | 9/2009 | Galand et al. | |
| 7,606,237 B2 * | 10/2009 | Dziong et al. | |
| 7,693,055 B2 | 4/2010 | Vasseur et al. | |
| 7,889,652 B1 | 2/2011 | Minei et al. | |
| 7,917,650 B2 | 3/2011 | Chandrayana et al. | |
| 8,144,586 B2 | 3/2012 | McNaughton et al. | |
| 8,374,090 B2 | 2/2013 | Morrill et al. | |
| 8,477,614 B2 | 7/2013 | Wiley et al. | |
| 8,619,596 B2 | 12/2013 | Wiley et al. | |
| 8,711,818 B2 | 4/2014 | Rajappan et al. | |
| 8,982,703 B2 | 3/2015 | Almog et al. | |
| 9,042,370 B2 | 5/2015 | Morrill et al. | |
| 9,143,433 B2 | 9/2015 | Bhattacharya | |
| 9,253,097 B1 * | 2/2016 | Barman et al. | |
| 9,379,963 B2 | 6/2016 | Tran et al. | |
| 9,451,500 B2 | 9/2016 | Racz et al. | |
| 9,507,745 B1 | 11/2016 | Bratt et al. | |
| 9,667,559 B2 | 5/2017 | Bhattacharya | |
| 9,749,244 B2 | 8/2017 | Adams | |
| 2006/0250961 A1 * | 11/2006 | Vasseur | |
| 2010/0232287 A1 | 9/2010 | Long et al. | |
| 2017/0149665 A1 | 5/2017 | Yousaf et al. | |
| 2017/0188056 A1 | 6/2017 | Do et al. | |
| 2017/0214623 A1 * | 7/2017 | Finkelstein | |

OTHER PUBLICATIONS

Dally et al., "Deadlock-Free Adaptive Routing in Multicomputer Networks Using Virtual Channels," IEEE Transactions on Parallel and Distributed Systems, vol. 4, No. 4, Apr. 1993, pp. 466-475.

Kar et al., "Minimum Interference Routing of Bandwidth Guaranteed Tunnels with MPLS Traffic Engineering Applications," IEEE Journal on Selected Areas in Communications, vol. 18, No. 12, Dec. 2000, pp. 2566-2579.

Burchard, Lars-Olof, "Advance Reservations of Bandwidth in Computer Networks," Jul. 14, 2004, retrieved at https://www.depositonce.tu-berlin.de/bitstream/11303/1183/1/Dokument_43.pdf.

Pinkston, Timothy Mark, "Deadlock Characterization and Resolution in Interconnection Networks," Deadlock Resolution in Computer-Integrated Systems, Chapter 13, Dec. 27, 2004, pp. 445-492, CRC Press 2004.

Hong et al., "Achieving High Utilization With Software-Driven WAN," SIGCOMM '13, Aug. 12-16, 2013, ACM 2013.

Birk et al., "Evolving to an SDN-Enabled ISP Backbone: Key Technologies and Applications," IEEE Communications Magazine, Oct. 2016, pp. 2-8, IEEE 2016.

International Search Report and Written Opinion dated Feb. 14, 2019 in International Application No. PCT/US2018/065957.

* cited by examiner

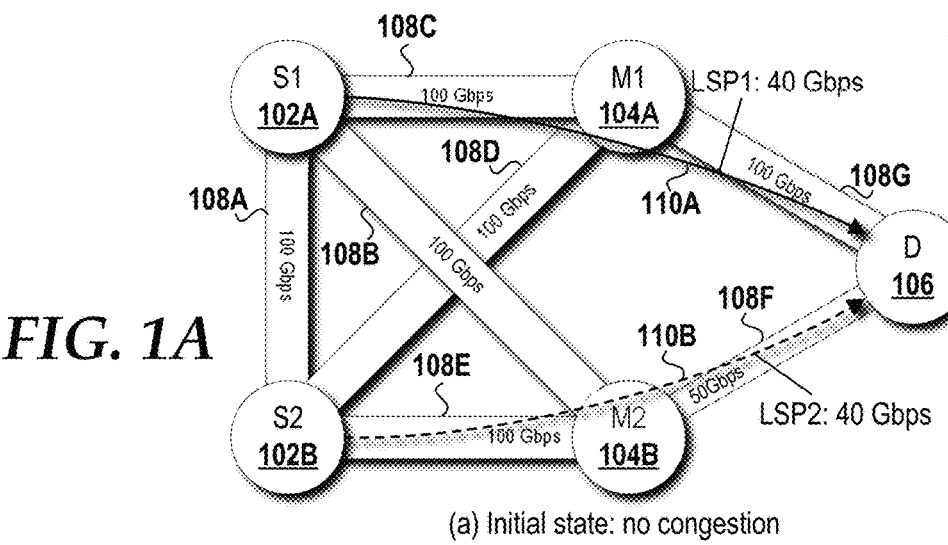
(a) Initial state: no congestion
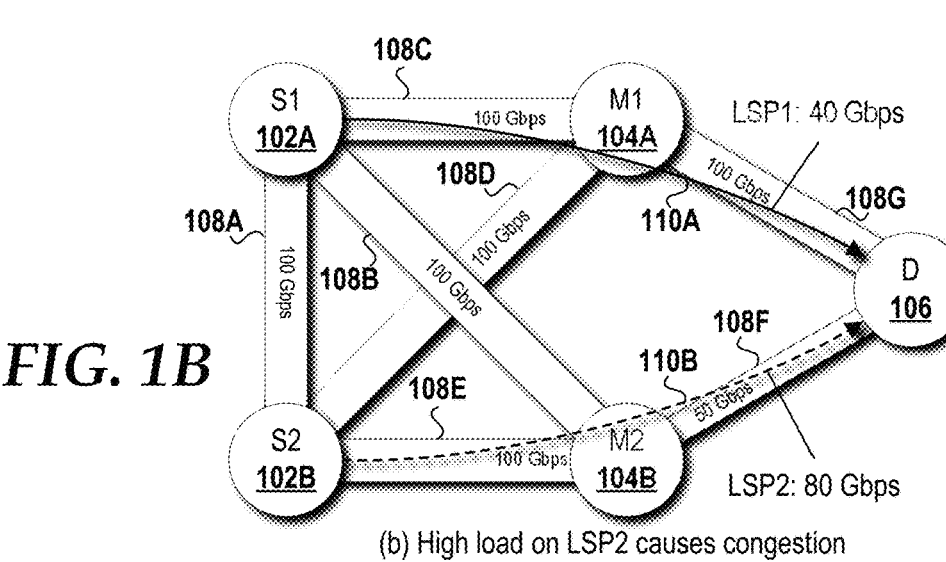
(b) High load on LSP2 causes congestion
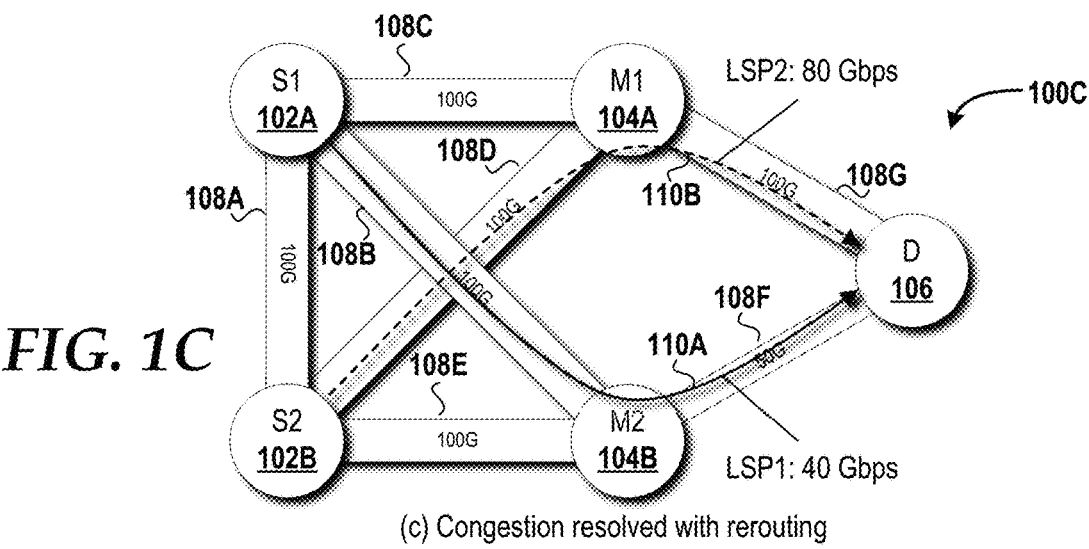
(c) Congestion resolved with rerouting

DEADLOCK-FREE TRAFFIC REROUTING IN SOFTWARE-DEIFNED NETWORKING NETWORKS

BACKGROUND

Software-defined networking ("SDN") has gained momentum among providers of network services, including data centers, cloud computing, and wide-area networks ("WANs") service providers. SDN networks allow service providers to create and activate new services and to update existing services on-demand and in near real-time. SDN networks provide network-on-demand services that allow network infrastructure to adapt to user demand.

SDN networks implement one or more SDN controllers to control operations of an SDN network, and one such operation is traffic routing. An SDN controller can determine traffic routes and instruct network routers to route data traffic along specific paths. If an SDN network is currently routing traffic on a set of paths and the SDN controller determines that a better route is available via a different set of paths, then the SDN controller also can determine that rerouting the network traffic is preferred. Rerouting the network traffic, however, is not straight-forward and could result in transient deadlocks where the network traffic, when rerouted using a traditional approach, would become overburdened and fail due to lack of available bandwidth.

SUMMARY

Concepts and technologies disclosed herein are directed to deadlock-free traffic rerouting in SDN networks. According to one aspect of the concepts and technologies disclosed herein, a centralized SDN controller can determine that a packet flow along a path within at least a portion of a network is to be rerouted from the path to a new path. The centralized SDN controller can initiate a reroute of the packet flow to the new path. The centralized SDN controller can request a bandwidth for the new path. The bandwidth can be determined such that bandwidth oversubscription on the new path is avoided. In response to the packet flow settling on the new path, the centralized SDN controller can adjust a requested bandwidth of the packet flow to a desired value to complete the reroute of the packet flow from the path to the new path.

In some embodiments, the network can be or can include a multiprotocol label switching ("MPLS") network. In these embodiments, the path can include a label switched path ("LSP") and the new path can include a new LSP.

In some embodiments, the portion of the network includes a network link between a first network node and a second network node. The first network node can include a first router and the second network node can include a second router. The first and second routers are unable to perform rerouting to resolve congestion of the network link. The network link can include a bandwidth capacity, and the congestion can result from a threshold percentage of the bandwidth capacity being reached or exceeded.

In some embodiments, the centralized SDN controller can determine that a further packet flow along a further path within at least a further portion of the network is to be rerouted from the further path to a further new path. The centralized SDN controller can initiate a further reroute of the further packet flow to the further new path. The centralized SDN controller can request a further bandwidth for the further new path. The further bandwidth can be determined such that bandwidth oversubscription on the further new path is avoided. In response to the further packet flow settling on the further new path, the centralized SDN controller can adjust a further requested bandwidth of the further packet flow to a further desired value to complete the further reroute of the further packet flow from the further path to the further new path.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 1A-1C are example network graphs showing that congestion appearing as a deadlock to distributed routing can be resolved by centralized control via a centralized SDN controller.

DETAILED DESCRIPTION

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Turning now to FIGS. 1A-1C, example network graphs 100A-100C will be described. The network depicted in the network graphs 100A-100C can implement multiprotocol label switching ("MPLS") for routing. The concepts and technologies disclosed herein are not limited to MPLS and are equally applicable to general flow-based routing. Accordingly, those skilled in the art will appreciate the applicability of alternative protocols to implement the concepts and technologies disclosed herein.

Figure 2:
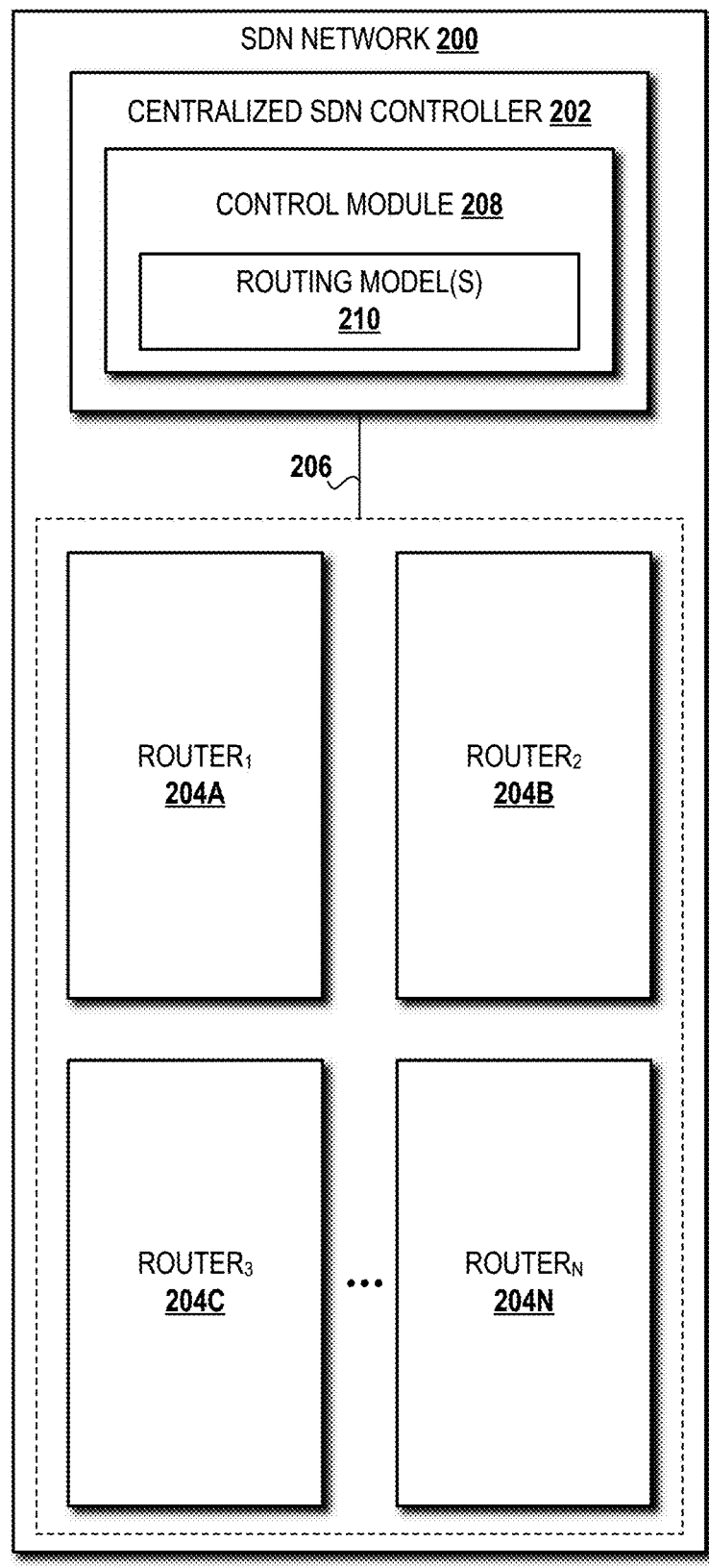
FIG. 2 is a block diagram illustrating aspects of an SDN network capable of implementing aspects of the embodiments presented herein.

The network graphs 100A-100C show that congestion appearing as a deadlock in a distributed routing framework can be resolved by control provided by a centralized SDN controller (best shown in FIG. 2). The network graphs 100A-100C each illustrate two source (headend) routers 102A ("S1"), 102B ("S2"), two middle routers 104A ("M1"), 104B ("M2"), and one destination router 106 ("D") that, in various combinations, form a plurality of network links ("links") 108A-108G, each of which has a specific bandwidth capacity. In particular, a link S1-S2 108A provides 100 Gigabits per second ("Gbps") of bandwidth; a link S1-M1 108C provides 100 Gbps; a link S1-M2 108B provides 100 Gbps; a link S2-M1 108D provides 100 Gbps; a link S2-M2 108E provides 100 Gbps; a link M2-D 108F provides 50 Gbps; and a link M1-D 108G provides 100 Gbps.

FIG. 1A illustrates a first network graph 100A representative of an initial state in which no congestion exists on any of the links 108A-108G. The first network graph 100A also shows two label switching paths ("LSPs")—LSP1 110A and LSP2 110B—both of which only utilize 40 Gbps of bandwidth, which is well below the bandwidth capacity of the links 108C, 108G through which the LSP1 110A traverses, and well below the bandwidth capacity of the links 108E, 108F through which the LSP2 110B traverses. As used herein, the terms "path" and "route" are used interchangeably because a single path is chosen as the route for packet flows.

FIG. 1B illustrates a second network graph 100B representative of a traffic surge and the resultant high load (80 Gbps) on LSP2 110B. The traffic surge causes congestion on the link M2-D 108F. FIG. 1C illustrates a third network graph 100C representative of a feasible re-routing solution to resolve the congestion on the link M2-D 108F shown in FIG. 1B. However, the two source (headend) routers—S1 102A and S2 102B—working in a distributed configuration without coordination therebetween are unable to execute a feasible re-routing solution. For the LSP2 110B, the source router S2 102B observes only 60 Gbps of available bandwidth capacity on the alternative path S2-M1-D, which is insufficient to meet the bandwidth demand (80 Gbps) of LSP2 110B. Similarly, the source router S1 102A for the LSP1 110A observes only 10 Gbps available on the alternative path S1-M2-D, which is insufficient to meet the bandwidth demand (40 Gbps) of LSP1 110A, and thus the source router S1 102A cannot re-route LSP1 110A to resolve the congestion. This creates a deadlock situation in the network. The concepts and technologies disclosed herein solve deadlock situations by guaranteeing that re-routing will succeed by implementing a centralized SDN controller, which will now be described with reference to FIG. 2.

Turning now to FIG. 2, aspects of an SDN network 200 capable of implementing aspects of the embodiments presented herein will be described. The SDN network 200 will be described with reference to FIG. 2 and additional reference to FIGS. 1B, 1C for context. The SDN network 200 includes a centralized SDN controller 202 and a plurality of routers 204A-204N (collectively, "routers 204"). In some embodiments, the SDN network 200 is a pure SDN network in which control plane functionality is provided exclusively by the centralized SDN controller 202 and data plane functionality is handled by the routers 204. In some other embodiments, the SDN network 200 is a hybrid SDN network in which the centralized SDN controller 202 and the routers 204 share control plane functionality and the routers 204 provide data plane functionality. Control plane functionality can include route/re-route determination, system/device configuration and management, routing table construction and maintenance, network topology information exchange, and/or other control plane functionality. For ease of explanation, the SDN network 200 will be described as a pure SDN network that controls routing operations performed by the routers 204 via a controller-router interface 206.

The illustrated centralized SDN controller 202 includes a control module 208 that provides control plane functionality, including routing and rerouting in accordance with one or more routing models 210. The centralized SDN controller 202 can find the solution shown in FIG. 1C and transition the SDN network 200 from the congested state shown in FIG. 1B to the congestion resolved state shown in FIG. 1C via execution, by one or more processors (best shown in FIGS. 4 and 5), of the control module 208 using the routing models 210. As described above with respect to FIG. 1C, if one of the source (headend) routers S1 102A or S2 102B is ordered to move one of the LSPs 110 to a new path for which the requested bandwidth exceeds the available bandwidth, a typical rerouting operation will either fail or preempt lower priority LSPs. To avoid triggering such exceptions, the centralized SDN controller 202 cannot issue commands to one or more of the routers 204 to reroute the two LSPs 110A, 110B to the desired new paths in a single step. Instead, the centralized SDN controller 202 can implement the routing model(s) 210 to reroute each of the LSPs 110A, 110B to a new path by requesting only a proportionally small bandwidth for each LSP (e.g., 1 Gbps in this example) along one or more of the links 108A-108G utilized by the new path. This ensures that none of the links 108A-108G will be oversubscribed. After the LSPs 110A, 110B settle on the new paths, the centralized SDN controller 202 can adjust the requested bandwidth for each of the LSPs 110A, 110B to reach the desired bandwidth and to complete the transition to the congestion resolved state shown in FIG. 1C.

The control module 208 can utilize one or more traffic engineering algorithms to determine when one or more LSPs needs to be rerouted. Upon determining that one or more LSPs needs to be rerouted, the centralized SDN controller 202 can execute the routing model(s) 210 to generate commands directed to the router(s) 204 and can send the commands to the router(s) 204 via the controller-router interface 206. The router(s) 204 can receive the commands and perform re-routing operations accordingly.

It should be understood that requesting a proportionally small bandwidth during transition does not necessarily cause notable traffic loss. The actual bandwidth of a given flow can be greater than the requested value as long as no congestion is created. When the centralized SDN controller 202 implements the routing model(s) 210 to reroute the LSPs 110A, 110B to their respective new paths by requesting only a proportionally small bandwidth on each LSP (e.g., 1 Gbps in this example), there exists a possibility of transient overload on certain ones of the links 108A-108G. This is because rerouting operations cannot occur precisely simultaneously. For example, in a situation involving two flows—flow 1 ($F_1$) and flow 2 ($F_2$)—and when $F_1$ is moved away from a certain link and $F_2$ is moved on to that link, at time $T_1$, the link carries $F_1$; at time $T_2$, $F_2$ is rerouted to the link; and at time $T_3$, $F_1$ is routed away from the link. In this example, between time $T_2$ and time $T_3$, the link carries both flows ($F_1$ and $F_2$) and can be temporarily overloaded. This overloading can be solved using two methods. The temporary overloading is usually rare and happens in highly congested networks and likely causes only traffic delay. Nevertheless, it can be avoided or minimized by reducing either the chance of overloading or the duration. The first method is to have a processor optimize the order of rerouting with the lowest traffic flows first. The second method is to employ multiple simultaneous rerouting to minimize the transition period.

Figure 3:
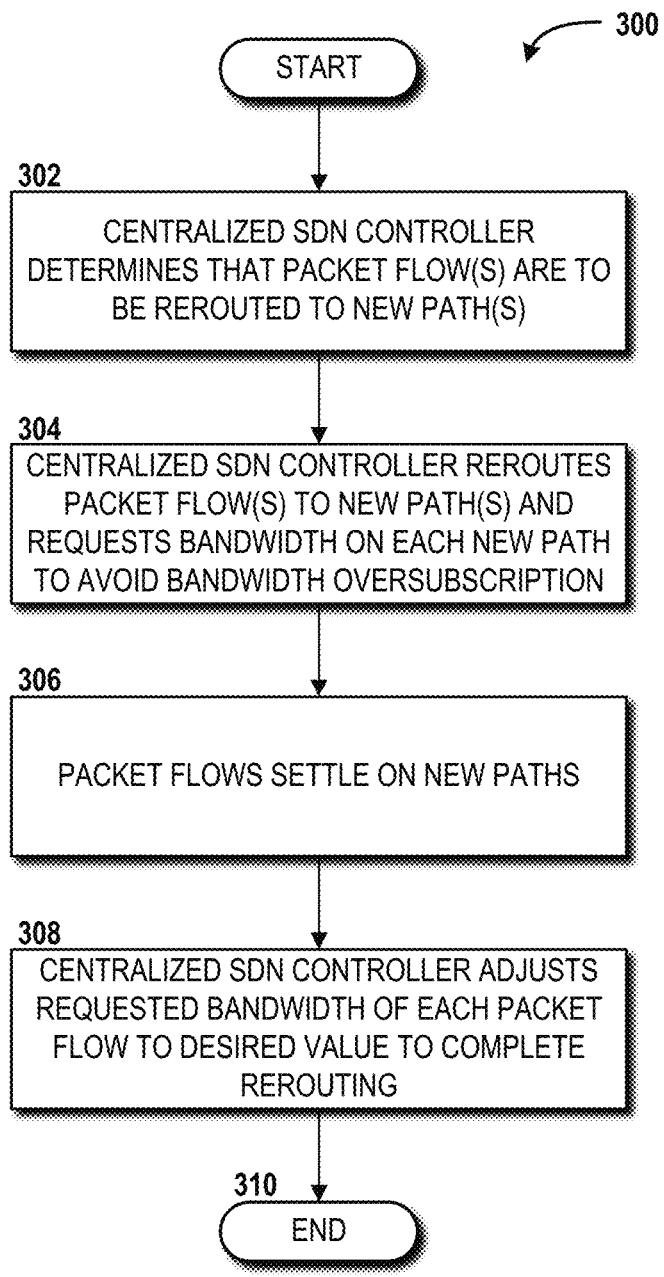
FIG. 3 is a flow diagram illustrating a method for deadlock free traffic rerouting in an SDN network, according to an illustrative embodiment.

Turning now to FIG. 3, a method 300 for deadlock free traffic rerouting in the SDN network 200 will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of one or more cloud environments, computing systems, devices, engines, controllers, or components disclosed herein to perform operations. It should be understood that the performance of one or more operations may include operations executed by one or more virtual processors at the instructions of one or more of the aforementioned hardware processors.

The method 300 begins and proceeds to operation 302, where the centralized SDN controller 202 determines that one or more packet flows are to be rerouted to one or more new paths. The centralized SDN controller 202 can determine that a given packet flow should be rerouted if that packet flow causes, at least in part, congestion on one or more links in a given network, such as in the example shown in FIG. 1B.

From operation 302, the method 300 proceeds to operation 304, where the centralized SDN controller 202 reroutes the flow(s) to the new path(s) determined at operation 302. The centralized SDN controller 202, at operation 304, also requests bandwidth on each new path to avoid bandwidth oversubscription on any links traversed by the flow(s). For a given link with a total bandwidth (e.g., 100 Gbps), the centralized SDN controller 202 can determine a proportionally small bandwidth to request, such as a given percentage of the total bandwidth (e.g., 1% for the given link would yield a proportionally small bandwidth of 1 Gbps).

From operation 304, the method 300 proceeds to operation 306, where the flow(s) settle on the new path(s). In other words, all packets associated with the flow(s) are moving through the new path(s). From operation 306, the method 300 proceeds to operation 308, where the centralized SDN controller 202 adjusts the requested bandwidth of each flow to a desired value (i.e., full bandwidth) to complete rerouting. From operation 308, the method 300 proceeds to operation 310, where the method 300 ends.

Figure 4:
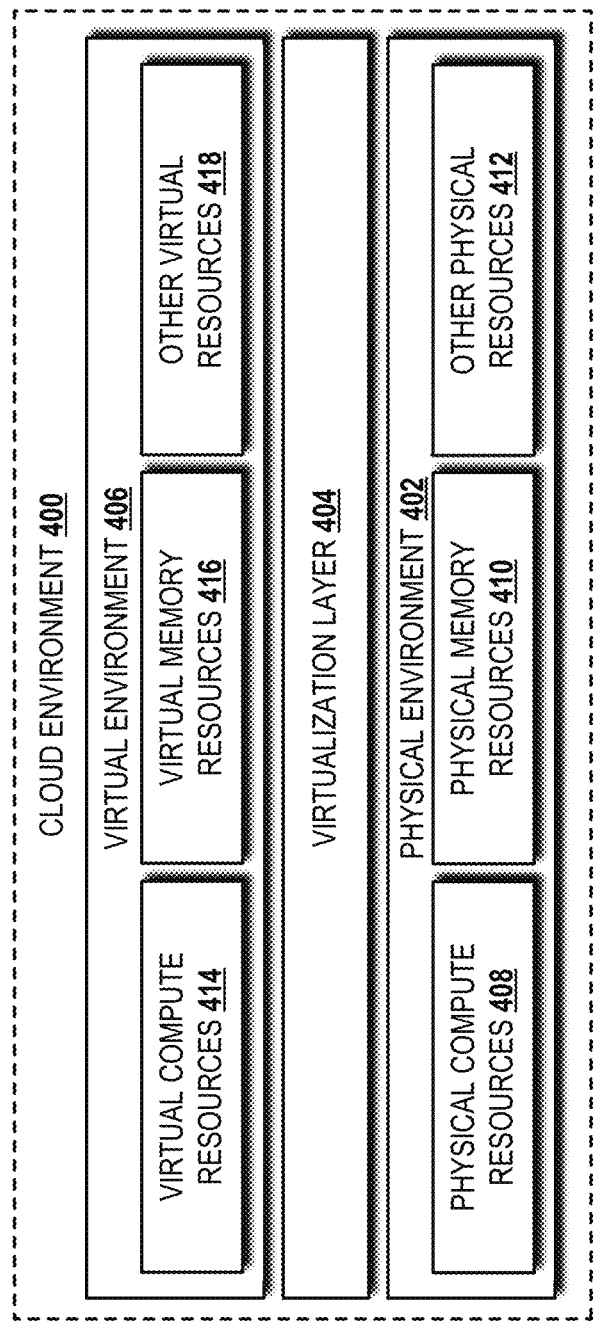
FIG. 4 is a block diagram illustrating aspects of an illustrative cloud environment capable of implementing aspects of the embodiments presented herein.

Turning now to FIG. 4, an illustrative cloud environment 400 will be described, according to an illustrative embodiment. The cloud environment 400 includes a physical environment 402, a virtualization layer 404, and a virtual environment 406. While no connections are shown in FIG. 4, it should be understood that some, none, or all of the components illustrated in FIG. 4 can be configured to interact with one another to carry out various functions described herein. In some embodiments, the components are arranged so as to communicate via one or more networks. Thus, it should be understood that FIG. 4 and the remaining description are intended to provide a general understanding of a suitable environment in which various aspects of the embodiments described herein can be implemented, and should not be construed as being limiting in any way.

The physical environment 402 provides hardware resources, which, in the illustrated embodiment, include one or more physical compute resources 408, one or more physical memory resources 410, and one or more other physical resources 412. The physical compute resource(s) 408 can include one or more hardware components that perform computations to process data and/or to execute computer-executable instructions of one or more application programs, one or more operating systems, and/or other software. In some embodiments, the centralized SDN controller 202 and/or one or more of the routers 204 can be implemented, at least in part, by the physical compute resources 408. The physical compute resources 408 can include one or more central processing units ("CPUs") configured with one or more processing cores. The physical compute resources 408 can include one or more graphics processing unit ("GPU") configured to accelerate operations performed by one or more CPUs, and/or to perform computations to process data, and/or to execute computer-executable instructions of one or more application programs, one or more operating systems, and/or other software that may or may not include instructions particular to graphics computations. In some embodiments, the physical compute resources 408 can include one or more discrete GPUs. In some other embodiments, the physical compute resources 408 can include CPU and GPU components that are configured in accordance with a co-processing CPU/GPU computing model, wherein the sequential part of an application executes on the CPU and the computationally-intensive part is accelerated by the GPU processing capabilities. The physical compute resources 408 can include one or more system-on-chip ("SoC") components along with one or more other components, including, for example, one or more of the physical memory resources 410, and/or one or more of the other physical resources 412. In some embodiments, the physical compute resources 408 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The physical compute resources 408 can be or can include one or more hardware components architected in accordance with an ARM architecture, available for license from ARM HOLDINGS of Cambridge, United Kingdom. Alternatively, the physical compute resources 408 can be or can include one or more hardware components architected in accordance with an x86 architecture, such an architecture available from INTEL CORPORATION of Mountain View, Calif., and others. Those skilled in the art will appreciate the implementation of the physical compute resources 408 can utilize various computation architectures, and as such, the physical compute resources 408 should not be construed as being limited to any particular computation architecture or combination of computation architectures, including those explicitly disclosed herein.

The physical memory resource(s) 410 can include one or more hardware components that perform storage/memory operations, including temporary or permanent storage operations. In some embodiments, the physical memory resource(s) 410 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the physical compute resources 408.

The other physical resource(s) 412 can include any other hardware resources that can be utilized by the physical compute resources(s) 408 and/or the physical memory resource(s) 410 to perform operations described herein. The other physical resource(s) 412 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The physical resources operating within the physical environment 402 can be virtualized by one or more virtual machine monitors (not shown; also known as "hypervisors") operating within the virtualization/control layer 404 to create virtual resources that reside in the virtual environment 406. The virtual machine monitors can be or can include software, firmware, and/or hardware that alone or in combination with other software, firmware, and/or hardware, creates and manages virtual resources operating within the virtual environment 406.

The virtual resources operating within the virtual environment 406 can include abstractions of at least a portion of the physical compute resources 408, the physical memory resources 410, and/or the other physical resources 412, or any combination thereof. In some embodiments, the abstractions can include one or more virtual machines upon which one or more applications can be executed. In some embodiments, the centralized SDN controller 202 and/or the routers 204 can be implemented in the virtual environment 406.

Figure 5:
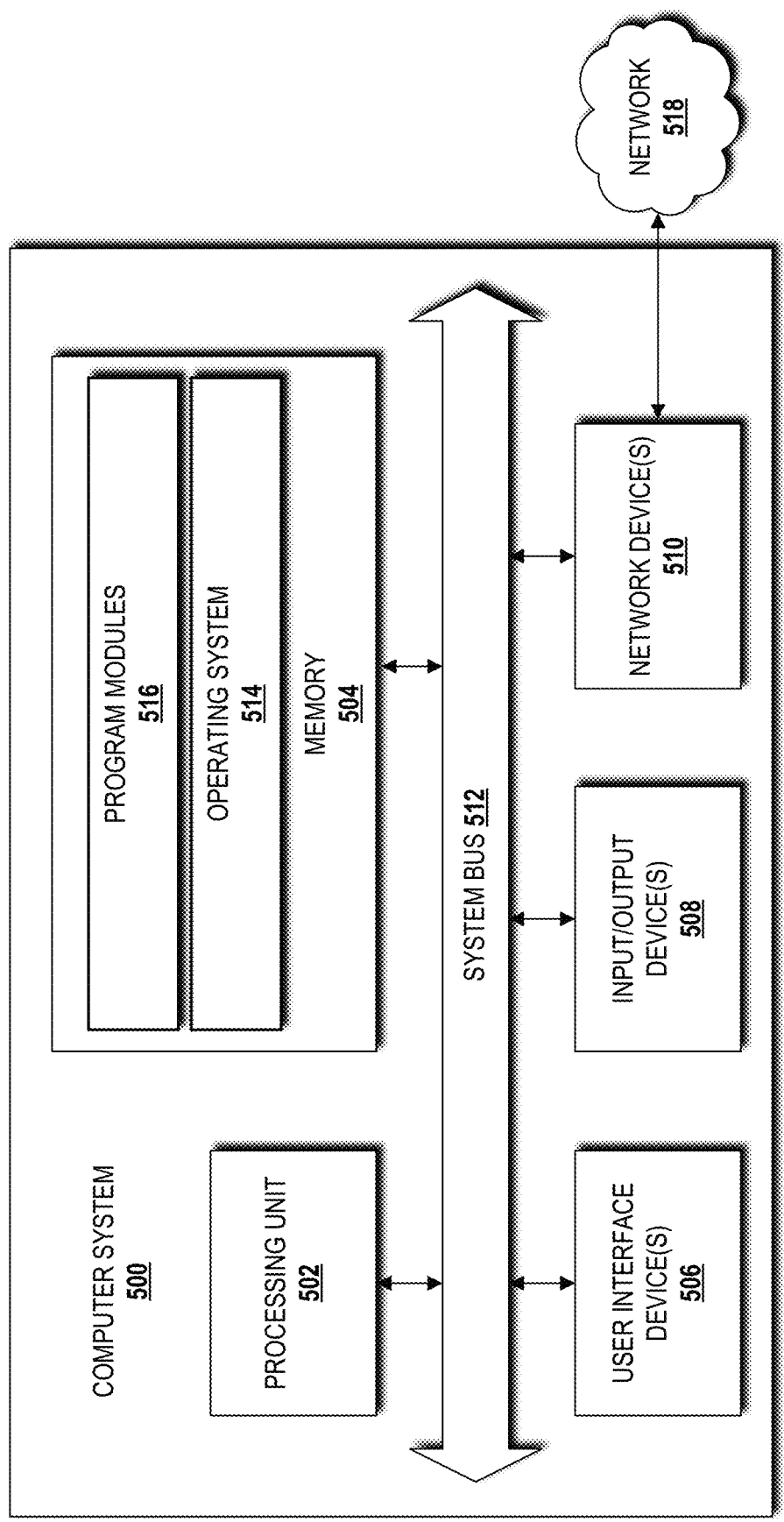
FIG. 5 is a block diagram illustrating an example computer system capable of implementing aspects of the embodiments presented herein.

FIG. 5 is a block diagram illustrating a computer system 500 configured to provide the functionality in accordance with various embodiments of the concepts and technologies disclosed herein. In some embodiments, the centralized SDN controller 202 and/or the routers 204 can be configured, at least in part, like the architecture of the computer system 500. In some implementations, the physical environment 402 (illustrated in FIG. 4) includes one or more computers that are configured like the architecture of the computer system 500. The computer system 500 may provide at least a portion of the physical compute resources 408, the physical memory resources 410, and/or the other physical resources 412. It should be understood, however, that modification to the architecture may be made to facilitate certain interactions among elements described herein.

The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein. The physical compute resources 408 (illustrated in FIG. 4) can include one or more processing units 502.

The memory 504 communicates with the processing unit 502 via the system bus 512. In some embodiments, the memory 504 is operatively connected to a memory controller (not shown) that enables communication with the processing unit 502 via the system bus 512. The physical memory resources 410 (illustrated in FIG. 4) can include one or more instances of the memory 504. The illustrated memory 504 contains an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 516 may include various software and/or program modules to perform the various operations described herein. The program modules 516 and/or other programs can be embodied in computer-readable media containing instructions that, when executed by the processing unit 502, perform various operations such as those described herein. According to embodiments, the program modules 516 may be embodied in hardware, software, firmware, or any combination thereof.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, PDAs, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer. In some embodiments, the I/O devices 508 can be used for manual controls for operations to exercise under certain emergency situations.

The network devices 510 enable the computer system 500 to communicate with other networks or remote systems via a network 518. Examples of the network devices 510 include, but are not limited to, a modem, a radio frequency ("RF") or infrared ("IR") transceiver, a telephonic interface, a bridge, a router, or a network card. The network 518 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 518 may be a wired network such as, but not limited to, a Wide Area Network ("WAN"), a wired Personal Area Network ("PAN"), or a wired Metropolitan Area Network ("MAN"). The network 518 may be any other network described herein.

Figure 6:
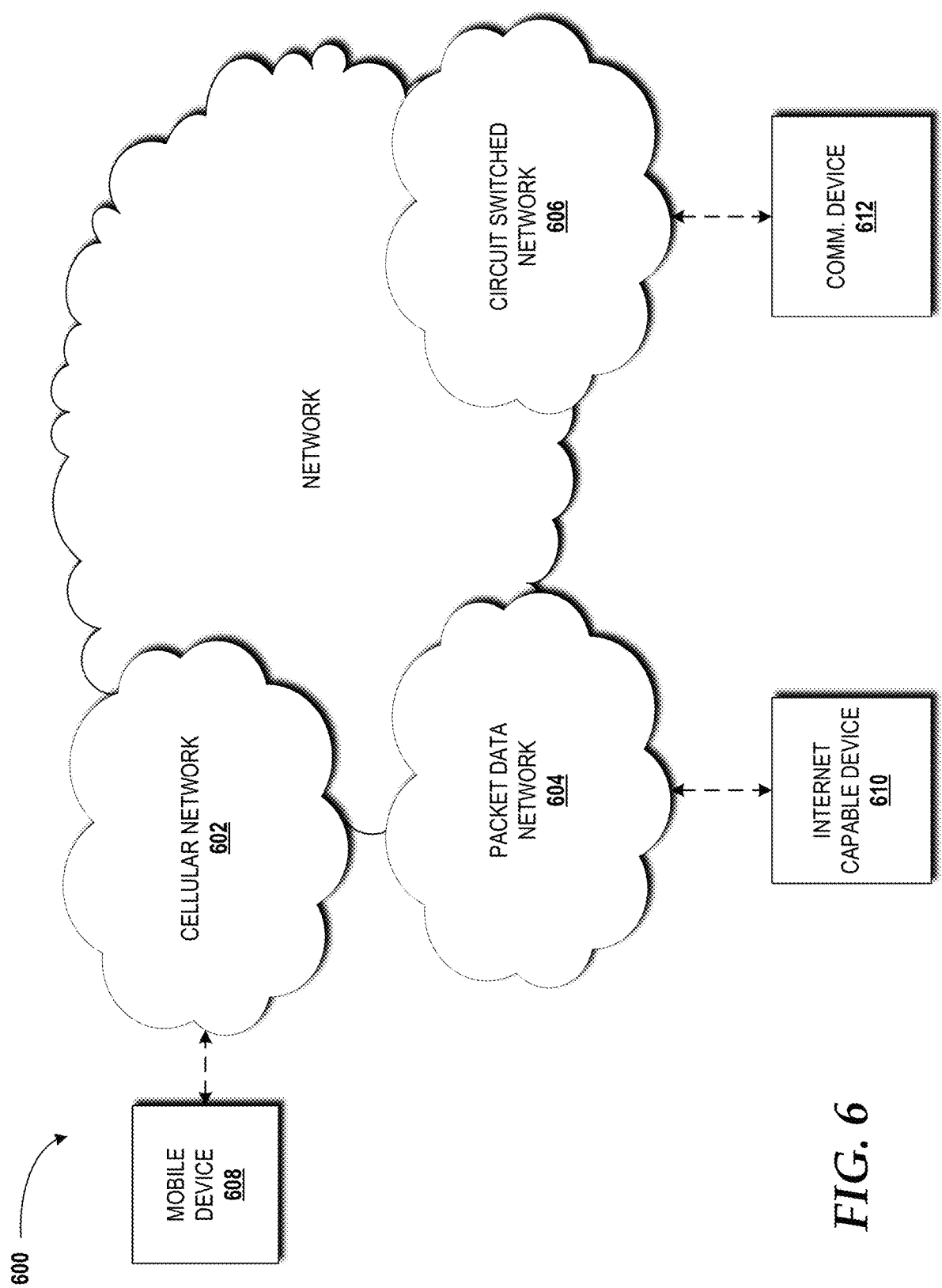
FIG. 6 is a diagram illustrating a network, according to an illustrative embodiment.

Turning now to FIG. 6, details of a network 600 are illustrated, according to an illustrative embodiment. The network 600 includes a cellular network 602, a packet data network 604, for example, the Internet, and a circuit switched network 606, for example, a public-switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, video data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a Global System for Mobile communications ("GSM") network and can provide data communications via General Packet Radio Service ("GPRS") and/or Enhanced Data rates for GSM Evolution ("EDGE"). Additionally, or alternatively, the cellular network 602 can be configured as a 3G Universal Mobile Telecommunications Service ("UMTS") network and can provide data communications via the High-Speed Packet Access ("HSPA") protocol family, for example, High-Speed Downlink Packet Access ("HSDPA"), High-Speed Uplink Packet Access ("HSUPA") (also known as Enhanced Uplink ("EUL")), and HSPA+. The cellular network 602 also is compatible with 4G mobile communications standards such as Long-Term Evolution ("LTE"), or the like, as well as evolved and future mobile standards.

The packet data network 604 includes various devices, for example, servers, computers, databases, routers, packet gateways, and other devices in communication with one another, as is generally known. The packet data network 604 can be or can include the SDN network 200. The packet data network 604 alternatively can provide connectivity to the SDN network 200. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system ("POTS"). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network is used to refer broadly to any combination of the networks 602, 604, 606.

Based on the foregoing, it should be appreciated that concepts and technologies directed to deadlock-free traffic rerouting in SDN networks have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A centralized software-defined networking controller comprising:
    a processor;
    memory having instructions stored thereon that, when executed by the processor, cause the processor to perform operations comprising
        determining that at least a portion of a network is in a congested state, wherein the network comprises a plurality network nodes that, in various combinations, form a plurality of network links, each of which has a specific bandwidth capacity, wherein the congested state comprises the specific bandwidth capacity of a first portion of the plurality of network links being exceeded by a first bandwidth demand of a first path, and wherein the congested state further comprises the specific bandwidth capacity of a second portion of the plurality of network links being exceeded by a second bandwidth demand of a second path,
        determining, based upon the congested state, that the first path is to be rerouted to a new first path,
        determining, based upon the congested state, that the second path is to be rerouted to a new second path,
        determining that the first path cannot be rerouted to the new first path and the second path cannot be rerouted to the new second path due to a deadlock condition,
        initiating, due to the deadlock condition, a first reroute of the first path to the new first path by requesting a first requested bandwidth comprising a first proportionally small bandwidth of the first bandwidth demand of the first path,
        completing the first reroute by adjusting the first requested bandwidth from the first proportionally small bandwidth to a first desired bandwidth,
        initiating, due to the deadlock condition, a second reroute of the second path to the new second path by requesting a second requested bandwidth comprising a second proportionally small bandwidth of the second bandwidth demand of the second path, and
        completing the second reroute by adjusting the second requested bandwidth from the second proportionally small bandwidth to a second desired bandwidth.

2. The centralized software-defined networking controller of claim 1, wherein:
    the network comprises a multiprotocol label switching network;
    the first path comprises a first label switched path;
    the second path comprises a second label switched path;
    the new first path comprises a new first label switched path; and
    the new second path comprises a new second label switched path.

3. The centralized software-defined networking controller of claim 1, wherein the operations for initiating the first reroute, completing the first reroute, initiating the second reroute, and completing the second reroute are based upon at least one routing model.

4. The centralized software-defined networking controller of claim 3, wherein initiating the first reroute, completing the first reroute, initiating the second reroute, and completing the second reroute each comprises generating commands directed to at least one route, and sending the commands to at least one router.

5. The centralized software-defined networking controller of claim 1, wherein requesting the first proportionally small bandwidth does not cause notable traffic loss.

6. The centralized software-defined networking controller of claim 1, wherein requesting the second proportionally small bandwidth does not cause notable traffic loss.

7. The centralized software-defined networking controller of claim 1, wherein the first proportionally small bandwidth comprises a percentage of a total bandwidth.

8. The centralized software-defined networking controller of claim 7, wherein the first desired bandwidth comprises the total bandwidth.

9. The centralized software-defined networking controller of claim 1, wherein the second proportionally small bandwidth comprises a percentage of a total bandwidth.

10. The centralized software-defined networking controller of claim 9, wherein the second desired bandwidth comprises the total bandwidth.

11. A computer-readable storage medium comprising computer-executable instructions that, when executed by a processor of a centralized software-defined networking controller, causes the centralized software-defined networking controller to perform operations comprising:
    determining that at least a portion of a network is in a congested state, wherein the network comprises a plurality of network nodes that, in various combinations, form a plurality of network links, each of which has a specific bandwidth capacity, wherein the congested state comprises the specific bandwidth capacity of a first portion of the plurality of network links being exceeded by a first bandwidth demand of a first path, and wherein the congested state further comprises the specific bandwidth capacity of a second portion of the plurality of network links being exceeded by a second bandwidth demand of a second path;

determining, based upon the congested state, that the first path is to be rerouted to a new first path;

determining, based upon the congested state, that the second path is to be rerouted to a new second path;

determining that the first path cannot be rerouted to the new first path and the second path cannot be rerouted to the new second path due to a deadlock condition;

initiating, due to the deadlock condition, a first reroute of the first path to the new first path by requesting a first requested bandwidth comprising a first proportionally small bandwidth of the first bandwidth demand of the first path;

completing the first reroute by adjusting the first requested bandwidth from the first proportionally small bandwidth to a first desired bandwidth;

initiating, due to the deadlock condition, a second reroute of the second path to the new second path by requesting a second requested bandwidth comprising a second proportionally small bandwidth of the second bandwidth demand of the second path; and completing the second reroute by adjusting the second requested bandwidth from the second proportionally small bandwidth to a second desired bandwidth.

12. The computer-readable storage medium of claim 11, wherein:
the network comprises a multiprotocol label switching network;
the first path comprises a first label switched path;
the second path comprises a second label switched path;
the new first path comprises a new first label switched path; and
the new second path comprises a new second label switched path.

13. The computer-readable storage medium of claim 11, wherein the operations for initiating the first reroute, completing the first reroute, initiating the second reroute, and completing the second reroute are based upon at least one routing model.

14. The computer-readable storage medium of claim 11, wherein:
the first proportionally small bandwidth comprises a percentage of a total bandwidth;
the first desired bandwidth comprises the total bandwidth.

15. The computer-readable storage medium of claim 11, wherein:
the second proportionally small bandwidth comprises a percentage of a total bandwidth;
the second desired bandwidth comprises the total bandwidth.

16. A method comprising:
determining, by a centralized software-defined networking controller comprising a processor, that at least a portion of a network is in a congested state, wherein the network comprises a plurality of network nodes that, in various combinations, form a plurality of network links, each of which has a specific bandwidth capacity, wherein the congested state comprises the specific bandwidth capacity of a first portion of the plurality of network links being exceeded by a first bandwidth demand of a first path, and wherein the congested state further comprises the specific bandwidth capacity of a second portion of the plurality of network links being exceeded by a second bandwidth demand of a second path;

determining, by the centralized software-defined networking controller, based upon the congested state, that the first path is to be rerouted to a new first path;

determining, by the centralized software-defined controller, based upon the congested state, that the second path is to be rerouted to a new second path;

determining, by the centralized software-defined controller, that the first path cannot be rerouted to the new first path and the second path cannot be rerouted to the new second path due to a deadlock condition;

initiating, by the centralized software-defined controller, due to the deadlock condition, a first reroute of the first path to the new first path by requesting a first requested bandwidth comprising a first proportionally small bandwidth of the first bandwidth demand of the first path;

completing, by the centralized software-defined controller, the first reroute by adjusting the first requested bandwidth from the first proportionally small bandwidth to a first desired bandwidth;

initiating, by the centralized software-defined controller, due to the deadlock condition, a second reroute of the second path to the new second path by requesting a second requested bandwidth comprising a second proportionally small bandwidth of the second bandwidth demand of the second path; and completing, by the centralized software-defined controller, the second reroute by adjusting the second requested bandwidth from the second proportionally small bandwidth to a second desired bandwidth.

17. The method of claim 16, wherein:
the network comprises a multiprotocol label switching network;
the first path comprises a first label switched path;
the second path comprises a second label switched path;
the new first path comprises a new first label switched path; and
the new second path comprises a new second label switched path.

18. The method of claim 16, wherein initiating the first reroute, completing the first reroute, initiating the second reroute, and completing the second reroute are based upon at least one routing model.

19. The method of claim 16, wherein:
the first proportionally small bandwidth comprises a percentage of a total bandwidth;
the first desired bandwidth comprises the total bandwidth.

20. The method of claim 16, wherein:
the second proportionally small bandwidth comprises a percentage of a total bandwidth;
the second desired bandwidth comprises the total bandwidth.

* * * * *